Figure 1:
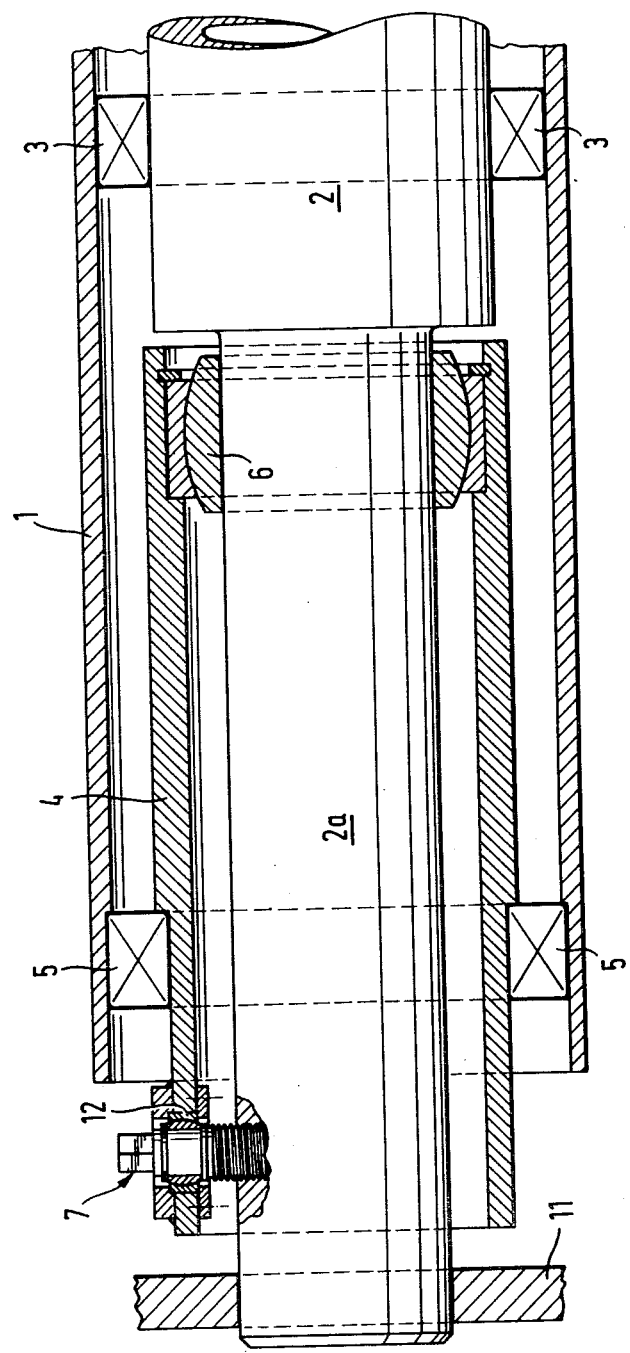

United States Patent [19]

Kuosa

[11] Patent Number: 4,470,183
[45] Date of Patent: Sep. 11, 1984

[54] ROLL CONSTRUCTION
[75] Inventor: Harri Kuosa, Kerava, Finland
[73] Assignee: Oy Wärtsilä Ab, Helsinki, Finland
[21] Appl. No.: 384,071
[22] Filed: Jun. 1, 1982
[30] Foreign Application Priority Data
Jun. 3, 1981 [FI] Finland .................................. 811720
[51] Int. Cl.³ ............................................. B21B 13/02
[52] U.S. Cl. .............................. 29/116 AD; 411/378
[58] Field of Search ...... 29/116 AD, 113 AD, 116 R; 100/162 B; 411/378

[56] References Cited

U.S. PATENT DOCUMENTS 3,443,295  5/1969  Denoyer et al. ............. 29/116 AD
3,672,018  6/1972  Junk et al. ..................... 29/116 AD
4,372,205  2/1983  Plaum ......................... 29/116 AD X

FOREIGN PATENT DOCUMENTS 1517082  2/1983  France ................................. 411/378

Primary Examiner—Carl E. Hall
Assistant Examiner—John T. Burtch
Attorney, Agent, or Firm—John Smith-Hill

[57] ABSTRACT

A roll comprises a rotatable mantle portion and a non-rotating shaft portion and, connected to the shaft portion, means for roll deflection adjustment. These means comprise a bushing or the like mounted around the non-rotating shaft portion at one roll end and being, by means of a bearing, in radially force transmitting contact with the roll mantle portion. The bushing is pivotably connected to the shaft portion at a position between the bearing and a second bearing between the shaft portion and the mantle portion at a position more remote from the roll end. The bushing is provided with a device for altering radially the position of the first mentioned bearing with respect to the shaft portion by altering the angle setting of the bushing with respect to the roll shaft portion.

9 Claims, 5 Drawing Figures

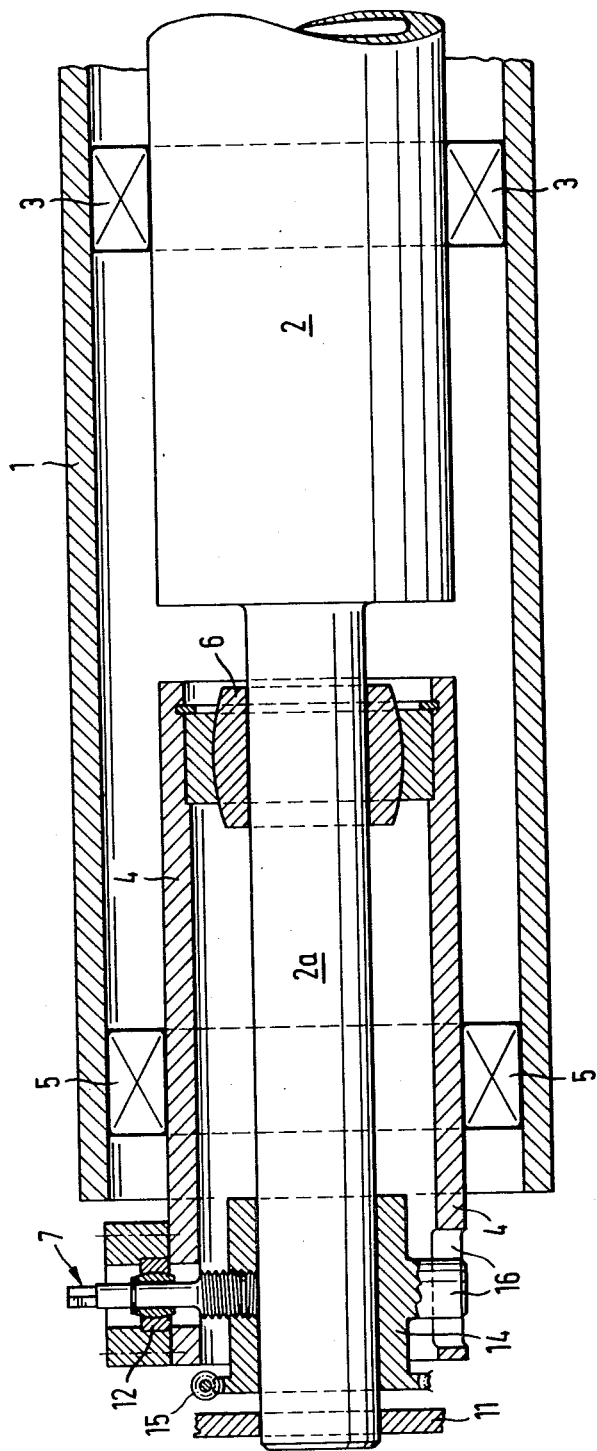

ROLL CONSTRUCTION

The invention relates to a roll comprising a rotatable mantle portion and a non-rotating shaft portion, and, connected to the shaft portion, means for roll deflection adjustment.

Several different types of deflection-adjustment rolls are known. Characteristic for one basic type is that the position of the roll shaft portion relative to the roll mantle portion is forcible adjusted at the ends of the roll, whereby such a deflection is caused in the shaft portion, that the mantle portion remains straight under load or obtains a desired curvature. This is known, for instance, from Patent Specification FI 54165. In such a roll, the adjustment range is usually quite restricted, especially is small rolls. The known constructions are also rather complicated or their functional reliability is questionable. Typically, the adjustment movement is carried out perpendicularly to the longitudinal axis of the roll, whereas the natural track of the adjustment movement would be a curved line.

The object of the invention is to eliminate the defects of the known constructions and to provide a deflection-adjustment roll with uncomplicated adjustment means providing adjustment movements conforming in a natural manner with the roll structure. The characteristics of the invention are stated in claim 1. In a roll constructed in this manner, the adjustment range can be relatively large even in a small-sized roll. The roll is relatively inexpensive to manufacture, and its adjustment mechanism is not vulnerable to function troubles; it will not, for instance, easily be jammed. Further, the adjustable roll mantle bearing moves along a curved line, which decreases the lateral forces acting on the bearing.

A roll according to the invention is well suited for use as a supercalender fly roll located at the side of the calender roll stack. The paper web treated in the calender is led out sidewards from the calender roll stack around the fly roll and back to the calender roll stack. Thereby the paper web is cooled and tensioned laterally to avoid wrinkling. Typical for a fly roll is, that it does not form a nip with another roll, but nevertheless, is under high lateral load caused by the tension of the web running around it.

In a preferred embodiment of the invention, the deflection-adjustment member is a screw member radially mounted in the roll. A member like this is sturdy and inexpensive and it is able to take up strong loads.

The properties of the roll can be improved by prestressing the adjustment means. The use of prestress in a deflection-adjustment roll is known per se, for instance, from Patent Specification No. FI 60430. In practice, the prestress is preferably so arranged, that a spring member is mounted between a roll adjustment bushing and the non-rotating shaft portion of the roll, whereby the spring prodvides the desired prestress. The spring member can be a spring mounted around said screw member. It is also of advantage, that adjustment of the spring prestress can be carried out without any alteration of the adjustment bushing setting relative to the non-rotating shaft portion of the roll. This can be obtained by providing the spring with a separate tensioning device. This tensioning device can be so connected to said screw member, that the screw itself operates the tensioning device, for instance, by mounting the spring member between a support surface on the screw member and another support surface on the adjustment bushing and by making the distance between these support surfaces adjustable without any change in the setting of the bushing. This can easily be arranged by so mounting the screw member in threads, that it is movable with respect to said bushing. The spring constant of the spring member used for the prestress should preferably be equal to the spring constant of the shaft portion at the same position.

In some cases, it is desirable to be able to change the direction of the plane, in which roll deflection adjustment is carried out. It might even be desirable to have a differently directed adjustment plane at both ends of the same roll. This usually requires that the mantle portion of the roll is axially divided into sections. Preferably, three sections or more are used. For instance, when using fly rolls at the sides of a calender stack, the tension in the web running around the fly roll may vary considerably in the cross-wise direction of the web. Under such circumstances, a different angle of deflection adjustment can be used at both ends of the fly roll to even the tension profile of the web.

In a roll according to the invention, the plane of the deflection adjustment can be easily changed, if the adjustment means are so connected to the shaft portion and to the mantle portion of the roll, that they can be turned coaxially with the roll shaft portion and mantle portion. This can be obtained by only a slight modification of the invention. Instead of connecting the adjustment screw directly to the shaft portion of the roll it can be connected to a bushing turnably journalled on the shaft portion. It is then possible to rotate or turn the entire adjustment mechanism unit including the adjustment bushing around the shaft portion of the roll.

Figure 2:
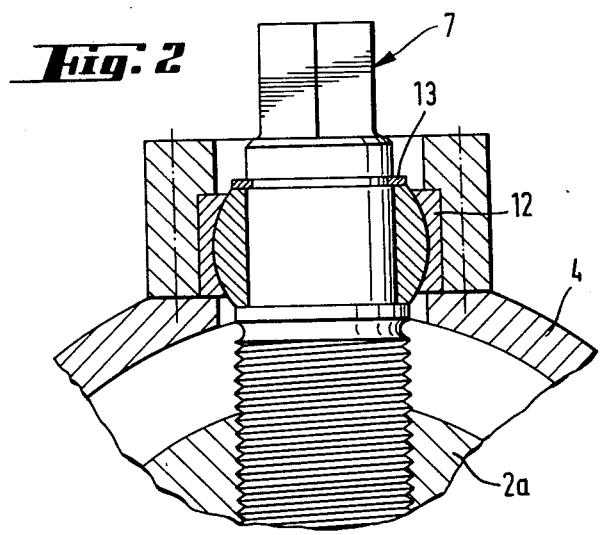
Figure 3:
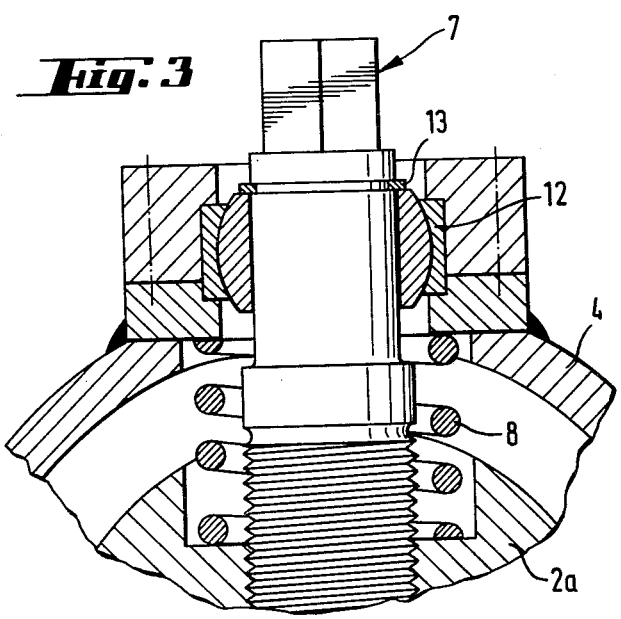
Figure 4:
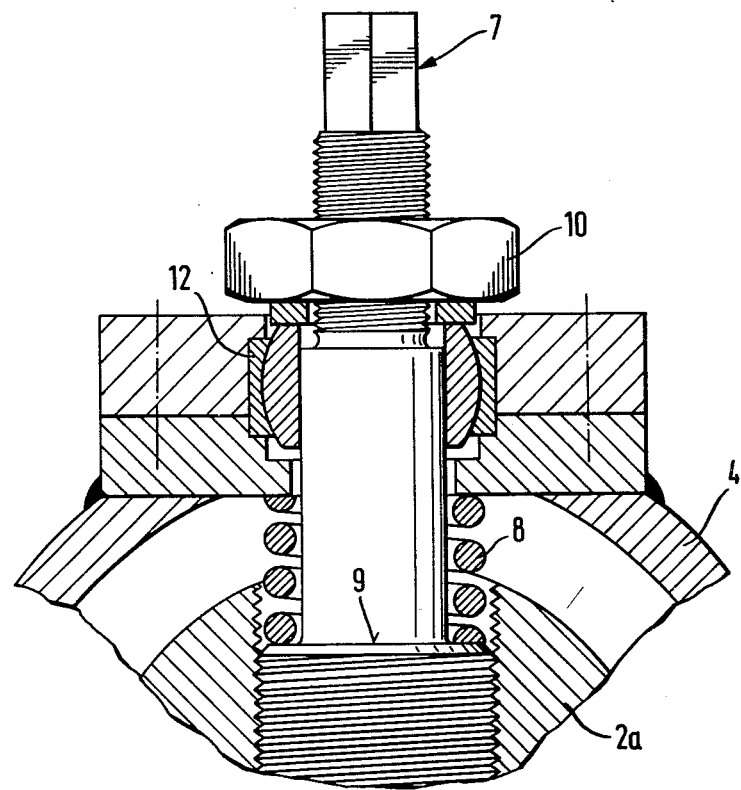

The invention will now be described, by way of example, with reference to the accompanying drawings, in which FIG. 1 shows schematically an axial section of one end of a roll according to the invention, FIGS. 2–4 show, in cross-section, different mounting arrangements of the deflection-adjustment screw of a roll according to the invention.

FIG. 5 shows schematically an axial section of a second embodiment of the invention.

In the drawings, 1 refers to the mantle portion of a roll and 2 to its shaft portion. The roll is supported through its shaft portion 2 in a frame 11. The mantle portion can be divided into separate parts mounted axially one after another. The adjustment of the roll deflection is carried out at the ends of the roll. More remote from the roll ends there are usually at least two bearings 3 stationarily mounted between mantle portion 1 and shaft portion 2. Outer end 2a of shaft portion 2 has a smaller cross-section that the main part of the shaft portion. Around this smaller part a bushing 4 is mounted, which by means of a bearing 5 is in force transmitting contact with mantle portion 1 of the roll. The inner end of bushing 4 is pivotally connected to shaft portion 2 by means of a pivot bearing 6. At the other end of the bushing 4, there is a deflection-adjustment screw 7, which is connected to shaft end portion 2a by threads. The angle between shaft portion 2 and bushing 4 is altered by rotating screw 7. Since the movement of bushing 4 is by bearing 5 transmitted to mantle portion 1, the angle between mantle 1 and shaft end portion 2a is altered at the same time. Because of this, mantle portion 1 can be kept straight even if the roll is under load, whereas shaft portion 2 bends under load. The drawings show one end of a roll according to the invention. It should be understood that the opposite end of the roll is provided with a similar deflection adjustment device.

The actual adjustment technique is known art, but its application has been considerably improved and simplyfied through the invention by using a separate bushing 4 as a member transmitting the adjustment movement. The movement of bearing 5 follows a circular curve, the center of which is the center of bearing 6. Thereby, the adjustment force is transmitted to mantle portion 1 in a more natural manner than when the adjustment movement is perpendicular to the central longitudinal axis of the roll. In order to make the adjustment movement possible, the attachment of adjustment screw 7 to bushing 4 must include a sufficient freedom of movement.

FIG. 2 shows an uncomplicated mounting of adjustment screw 7. It is attached to bushing 4 with a large clearance or by means of a pivot bearing 12, and is threaded into shaft end portion 2a. In practice, the adjustment of the roll deflection is carried out by giving the roll a desired curvature when it is unloaded. The curvature of the roll will decrease with increasing load.

FIG. 3 shows an embodiment, in which there is a spring 8 between bushing 4 and shaft end portion 2a in order to prestress the adjustment arrangement. The prestress functions so, that the roll is first given the desired curvature by turning the screw 7 and at the same time prestressing spring 8. The curvature will decrease the more the roll load increases, until the load exceeds the prestress of spring 8. Thereafter, the roll remains straight.

FIG. 4 shows an embodiment, in which the prestress of spring 8 can be altered without altering the position between bushing 4 and shaft portion 2. This means in practice, that spring 8 can be equally much loaded regardless of the chosen curvature of shaft portion 2. Adjustment screw 7 is connected to bushing 4 as well as to shaft end portion 2a by threaded portions and a spring 8 is mounted between bushing 4 and a support surface 9 on adjustment screw 7. The connection of screw 7 to bushing 4 is arranged by means of a turnable nut 10. The axial position of screw 7 with respect to bushing 4 is altered by turning nut 10. This does not change the position of screw 7 with respect to shaft end portion 2a. In practice, the adjustment is carried out so, that spring 8 is preloaded by turning nut 10 and the actual deflection adjustment is carried out by means of screw 7. The construction shown maintains the roll curvature independently of the load, when the load is higher than a load corresponding the prestress of spring 8. At loads smaller than this, the roll deflection decreases with an increasing load.

FIG. 5 shows a more sophisticated embodiment of the invention, in which the plane of adjustment can be varied. This embodiment differs from the one shown in FIGS. 1–4 therein, that adjustment screw 7 is not directly connected to shaft end portion 2a, but to a connection bushing 14 turnable on shaft end portion 2a. Due to the bearings 6 and 5, adjustment bushing 4 is also turnable relatively to roll shaft portion 2 and roll mantle portion 1. This means that the whole adjustment unit connected to adjustment bushing 4 can be freely rotated in relation to roll shaft portion 2 and roll mantle portion 1. Such a rotation or turning of the adjustment unit can take part, for instance, as shown in FIG. 5 by connecting a worm gear 15 directly to connection bushing 14.

The worm of worm gear 15 can be motor driven or manually operated. For transmitting the torque of worm gear 15 to adjustment bushing 4 a connection 16 can be used comprising a shaft rigidly connected to connection bushing 14 and receive in an elongated opening in adjustment bushing 4. It is possible to have an arrangement of the kind shown in FIG. 5 at both ends of the roll and this means that a different plane of adjutment can be used at both ends of the roll.

The invention is not limited to the embodiment shown, but several modifications thereof are feasible within the scope of the attached claims.

I claim:

1. A roll having first and second opposite ends and comprising a tubular, rotatable mantle portion, a non-rotating shaft portion disposed within the mantle portion, and means for roll deflection adjustment connected to said shaft portion at said first end of the roll and comprising a bushing or the like mounted around said shaft portion at the first end of said roll, a first bearing in radially force transmitting contact between said bushing and an inner surface of said mantle portion, a second bearing in radially force transmitting contact between said shaft portion and said mantle portion at a position remote from said first end of the roll, means pivotally connecting said bushing to said shaft portion at a position between the first and second bearings and located at a position axially remote from said first bearing, and a device mounted on the bushing and acting between the bushing and said shaft portion for altering radially the position of said first bearing with respect to said shaft portion by pivotably altering the angle of said bushing with respect to said shaft portion.

2. A roll according to claim 1, in which said device comprises a radially mounted screw for setting the angle of said bushing relative to said shaft portion.

3. A roll according to claim 1, in which said bushing and said device mounted on the bushing are rotatable with respect to said shaft portion and to said mantle portion of said roll.

4. A roll according to claim 3, comprising second means for roll deflection-adjustment connected to said shaft portion at the second end of the roll, the roll adjustment means at the two ends of the roll being adapted to provide deflection adjustment in different planes at the two ends respectively of said roll.

5. A roll according to claim 3, in which said device comprises a radially mounted screw arranged in force transmitting contact with a member set around and freely rotatable with respect to said shaft portion.

6. A roll according to claim 2, comprising a loaded spring member located between said bushing and said shaft portion for providing a prestress in said roll deflection adjustment means.

7. A roll according to claim 6, in which said spring member is a spring mounted around said screw.

8. A roll according to claim 6, comprising means for adjusting the prestress of said spring member without altering the position of said bushing with respect to said shaft portion.

9. A roll according to claim 8, in which said spring member is arranged to be prestressed between a support surface rigid with said screw and a support surface rigid with said bushing, the distance between said support surfaces being adjustable without changing the angle of said bushing with respect to said shaft portion.

* * * * *